(12) United States Patent
Pock et al.

(10) Patent No.: US 8,749,368 B2
(45) Date of Patent: Jun. 10, 2014

(54) SYSTEM AND METHOD FOR SIGNALING, MARKETING, AND ADVERTISING ALTERNATIVE FUEL-BASED VEHICLES

(76) Inventors: Leslie A. Pock, Arlington, TX (US); John P. Heptig, Dallas, TX (US)

( * ) Notice: Subject to any disclaimer, the term of this patent is extended or adjusted under 35 U.S.C. 154(b) by 152 days.

(21) Appl. No.: 13/135,930

(22) Filed: Jul. 19, 2011

(65) Prior Publication Data

US 2012/0013456 A1 Jan. 19, 2012

Related U.S. Application Data

(60) Provisional application No. 61/365,416, filed on Jul. 19, 2010.

(51) Int. Cl.
*B60Q 1/00* (2006.01)

(52) U.S. Cl.
USPC ............ 340/439; 340/426.34; 340/691.6

(58) Field of Classification Search
USPC .......... 340/439, 438, 441, 435, 426.34, 431, 340/450.2, 450.3, 463–464, 468, 539.3, 340/632, 691.6, 693.1
See application file for complete search history.

(56) References Cited

U.S. PATENT DOCUMENTS

| | | | | |
|---|---|---|---|---|
| 5,421,162 A * | 6/1995 | Gustafson et al. | ................... | 62/7 |
| 5,658,013 A * | 8/1997 | Bees et al. | ..................... | 280/831 |
| 5,668,310 A * | 9/1997 | Parkman et al. | ........... | 73/114.52 |
| 5,803,054 A * | 9/1998 | Yamazaki et al. | ............. | 123/519 |
| 5,858,568 A * | 1/1999 | Hsu et al. | ..................... | 429/425 |
| 6,370,050 B1 * | 4/2002 | Peng et al. | ...................... | 363/98 |
| 2009/0314382 A1 * | 12/2009 | Capizzo | ........................... | 141/2 |

* cited by examiner

*Primary Examiner* — Daniel Previl
(74) *Attorney, Agent, or Firm* — Schultz & Associates, P.C.

(57) ABSTRACT

A system and method for signaling, marketing, and advertising alternative fuel-based vehicles that easily installs into new or pre-existing alternative fuel-based vehicles. In a preferred embodiment, the system comprises an electronic control unit ("ECU") installed in the vehicle, which determines whether an internal combustion engine or alternative power source powers the vehicle. The system further comprises a driver display and in-car display both of which are connected to the ECU. The ECU monitors the power status of the vehicle and illuminates vehicle displays and transmits a signal to illuminate exterior advertising displays when the vehicle is operating on the alternative power source or in a fuel-efficient mode.

13 Claims, 3 Drawing Sheets

SYSTEM AND METHOD FOR SIGNALING, MARKETING, AND ADVERTISING ALTERNATIVE FUEL-BASED VEHICLES

RELATED APPLICATIONS

This application claims priority to U.S. Provisional Application No. 61/365,416 filed Jul. 19, 2010.

FIELD OF THE INVENTION

The present invention relates to systems and methods for controlling and illuminating signage. In particular, the invention relates to illuminating signage and lighting on the exterior of an alternative fuel-based vehicle, and on advertising displays.

BACKGROUND OF THE INVENTION

As oil and other petroleum resources are depleted and become scarcer around the world, the cost of conventional petroleum-based automotive fuels such as gasoline and diesel will continue to rise. With the rise of conventional automotive fuel costs and the desire to limit, reduce, or eliminate air pollution from automobiles and emissions of so-called "greenhouse gases," the development and sales of electric, hybrid, and other alternative fuel-based vehicles such as liquid natural gas, bio-fuel, hydrogen cars and trucks have increased as well. The term "hybrid" vehicle is commonly used to refer to a hybrid electric-petroleum powered vehicle, with an electric motor powered by electric batteries and an internal combustion engine powered by gasoline, diesel, bio-fuel, or a variety of other fuels. However, the number and percentage of electric, hybrid, and other alternative fuel-powered cars on the road are still small compared to conventional gasoline and diesel-powered vehicles. The cost to develop and manufacture electric, hybrid, or alternative fuel-powered vehicles are typically higher than for comparable conventional gasoline or diesel power vehicles. As a result, these higher costs have contributed to inhibiting sales of electric, hybrid, and other alternative fuel-powered vehicles.

In virtually every city or metropolitan area, traffic congestion on the roads and highways is a fact of life. When drivers, passengers, and their vehicles are caught in traffic congestion, this usually creates significant tension and frustration on the part of millions of drivers and passengers every day. The anxiety of traffic congestion is heightened and feels more emphatically inescapable during rush hours, not to mention road construction or an unanticipated road-clogging accident. Such feelings of tension, anxiety, and stress while ensnared in slow-moving traffic are exacerbated even further with the realization that money used for expensive conventional gasoline or diesel is literally being burned up and completely wasted, day after day, sitting at a standstill or in slow-moving traffic.

Therefore, it is desirable to have a system and method for signaling, marketing, and advertising alternative fuel-based vehicles for others to readily identify the uses and economic benefits of operating an alternative fuel-based vehicle.

SUMMARY OF THE INVENTION

The inventor hereby discloses a system and method for signaling, marketing, and advertising alternative fuel-based vehicles. The system easily installs into newly manufactured and previously existing alternative fuel-based vehicles.

In a preferred embodiment, the system comprises an electronic control unit installed in an alternative fuel-based vehicle, which is connected to at least one sensor connected to the transmission. The transmission is connected to an internal combustion engine and an alternative power source, either one of which drives the wheels of the vehicle. The system further comprises a driver display and in-car display which are both connected to the electronic control unit. The electronic control unit monitors the power status of the vehicle and illuminates displays on the vehicle and transmits a signal to illuminate exterior advertising displays when the vehicle is operating on the alternative power source.

BRIEF DESCRIPTION OF THE DRAWINGS

The disclosed embodiments will be disclosed with reference to the accompanying drawings. Like pieces in different drawings carry the same number.

DETAILED DESCRIPTION

Figure 1:
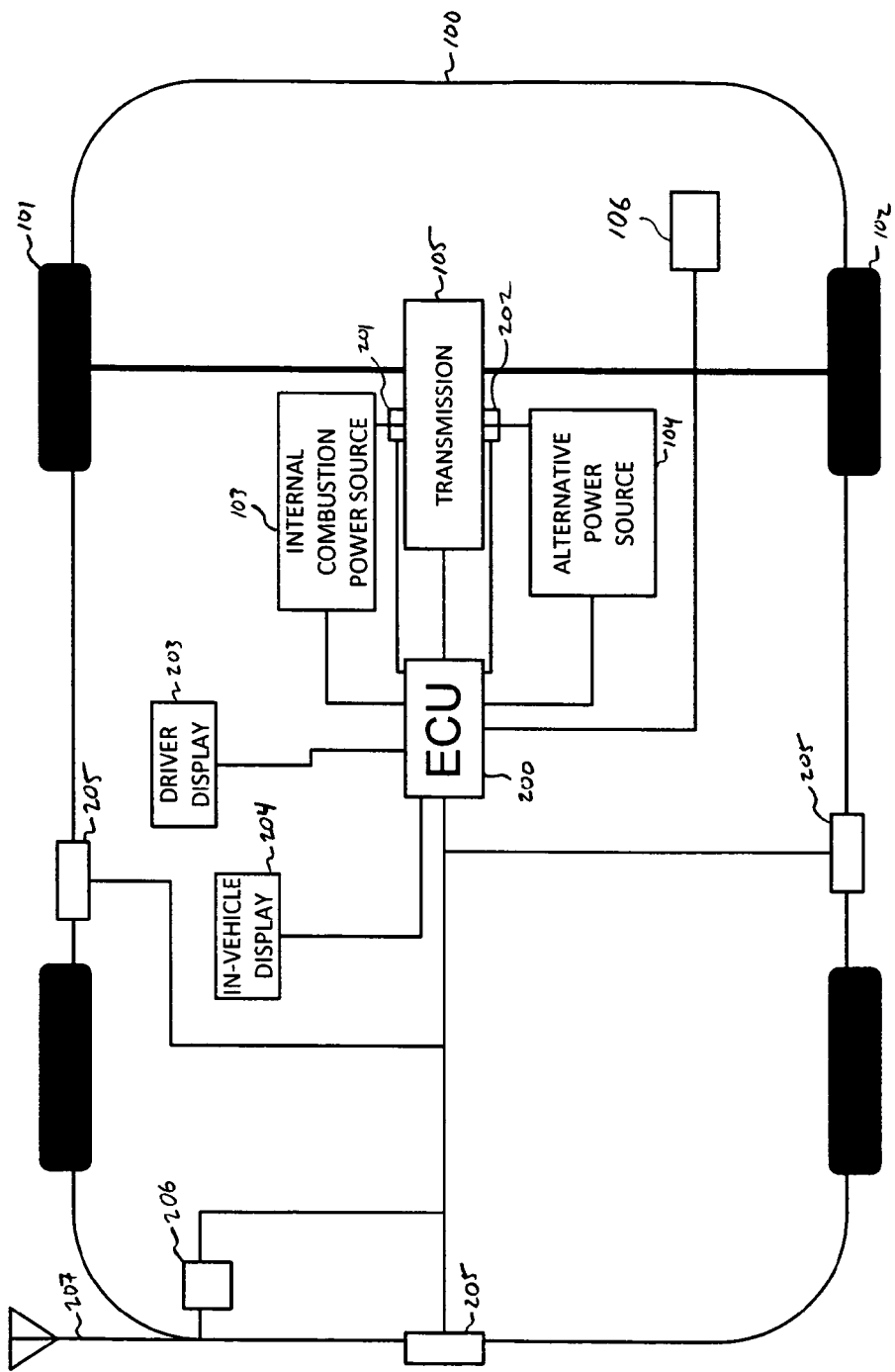
FIG. 1 is a schematic of a preferred embodiment.

Referring to FIG. 1, vehicle 100 has internal combustion power source 103 and alternative power source 104, both of which are connected to transmission 105. Transmission 105 is connected to wheels 101 and 102. Sensors 201 and 202 are connected to internal combustion power source 103 and alternative power source 104, respectively, to detect their respective engagement statuses. Electronic control unit 200 is connected to internal combustion power source 103, alternative power source 104, sensors 201 and 202, and vehicle battery 106.

Electronic control unit 200 is further connected to driver display 203 and in-vehicle display 204. Displays 205 are connected to electronic control unit 200 and are attached to the vehicle in a position to be viewed from the exterior. Transmitter 206 is connected to electronic control unit 200. Antenna 207 is connected to transmitter 206.

In a preferred embodiment, electronic control unit 200 is a computer having a microprocessor known in the art and internal memory containing programming to evaluate the operation of vehicle 100. In-vehicle display 204 is preferably an LCD screen having a diagonal screen size dimension of five inches (5"). Driver display 203 is a backlit indicator light known in the art. In a preferred embodiment, displays 205 are LED displays. However, any form of lighting or illuminated lettering or signage appearing in any location on the vehicle, such as, but not limited to, embedded signage in the rear window glass, side windows, bumper areas, or at any other sites on the vehicular body, designed to communicate to others that vehicle 100 is currently running in a fuel-free or fuel-efficient mode of operation. Displays 205 can contain a multitude of messages. For example, displays 205 can be illuminated messages including, but not limited to, "Running Green" or can illuminate pre-installed lettering or emblems on the vehicle. For example, illuminating or backlighting (for example green backlighting) the "Hybrid" emblem or a vehicle manufacturer's logo or a green-lit plant leaf design logo.

In a preferred embodiment, internal combustion power source 103 is a gasoline, diesel, or bio-fuel powered engine. Alternative power source 104 is an electric motor, hydrogen fuel cell, natural gas-powered engine or solar powered engine. Transmission 105 is a transmission on a hybrid or alternative fuel-based vehicle known in the art. Sensors 201 and 202 are MagCanica Polarized Bank Type II torque sensors. Transmitter 206 is a wireless multiple in and multiple out ("MIMO") cellular transmitter known in the art. Antenna 207 is an antenna suitable for MIMO cellular transmission known in the art.

Figure 2:
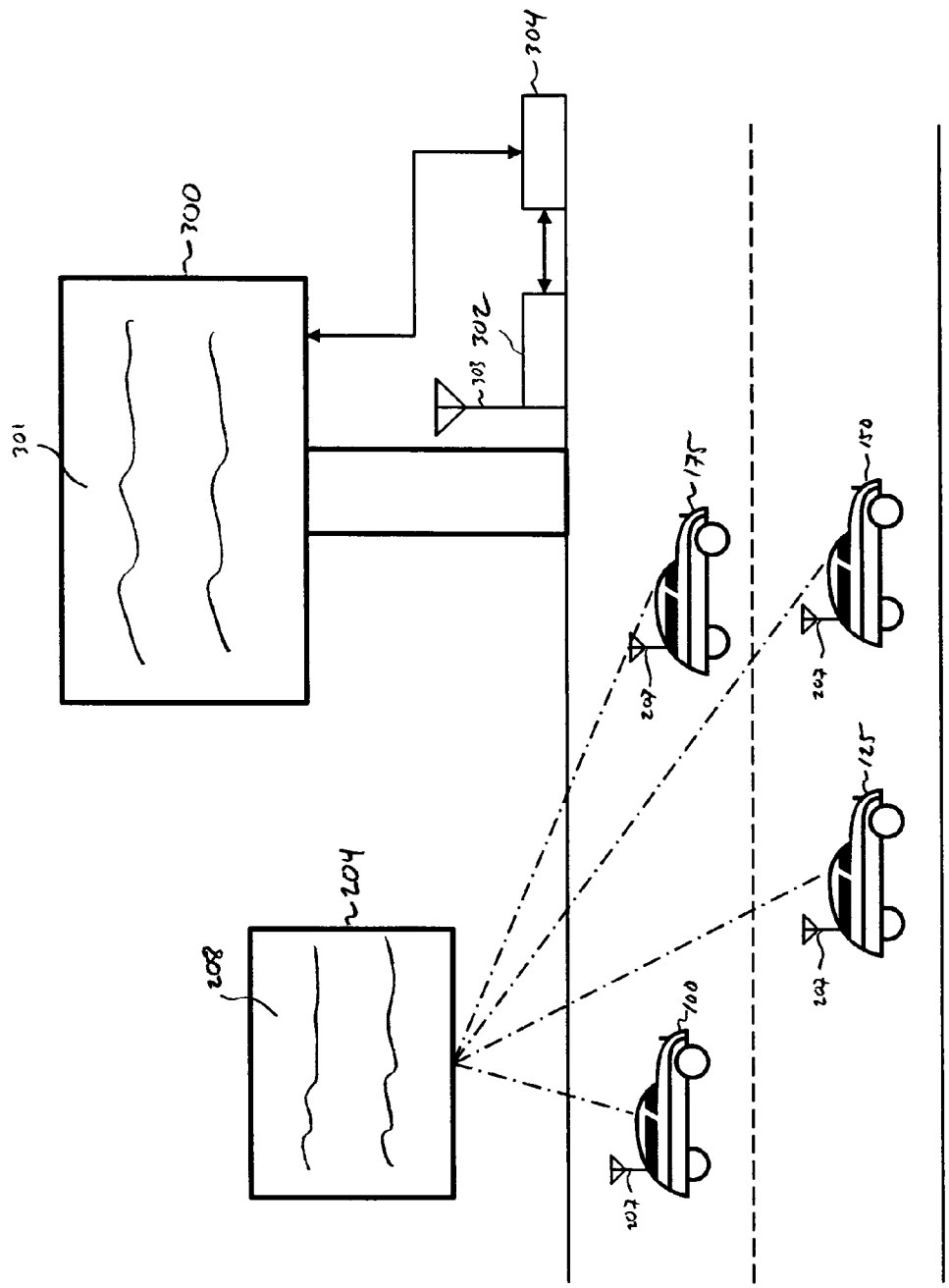
FIG. 2 is a schematic of a preferred embodiment.

Referring to FIG. 2, vehicle 100 has antenna 207. Vehicle 125 has antenna 207. Vehicle 150 has antenna 207. Vehicle 175 has antenna 207. Vehicles 100, 125, 150 and 175 each have in-vehicle display 204 displaying message 208. Antennae 207 are in wireless connection with antenna 303, which is connected to receiver 302. Receiver 302 is in electronic connection with controller 304. The wireless connection between the vehicles and receiver 302 may be over a direct wireless radio communication link or through an indirect wireless communication link via the Internet using radio base stations in a cellular mobile phone network and an Internet connection to controller 304. Controller 304 creates and controls display 301 on billboard 300, which is based on power status data received from vehicles 100, 125, 150, and 175. Vehicles 100, 125, 150 and 175 each transmit their respective alternative power status to antenna 303 to transmit their respective status to billboard 300 through receiver 302 and controller 304. The statuses are then used to create and display message 301. Further, each vehicle's alternative power status is shown in in-vehicle display 204 as message 208.

In a preferred embodiment, in-vehicle display 204 displays message 208, such as "Ten other cars around you are green vehicles saving money and the environment." Other similar messages may be displayed as well. Message 301 on billboard 300 displays messages about vehicles in the local area (or a larger geographic region, such as city, state, country, continent or global). For example, "There are ten green vehicles on the road right now. Are you one of them?" Additional advertising messages may be displayed along with message 301 about alternative fuel-based vehicles nearby.

In a preferred embodiment, billboard 300 is a Daktronics digital billboard. Antenna 303 is an antenna suitable for MIMO cellular transmission known in the art. Receiver 302 is a wireless MIMO cellular receiver known in the art connected to a personal computer having a microprocessor and internal memory having programming to count the number vehicles in the fuel-efficient mode. Receiver 302 is connected through the Internet to controller 304. Controller 304 is the Daktronics Visiconn® display management system.

Figure 3:
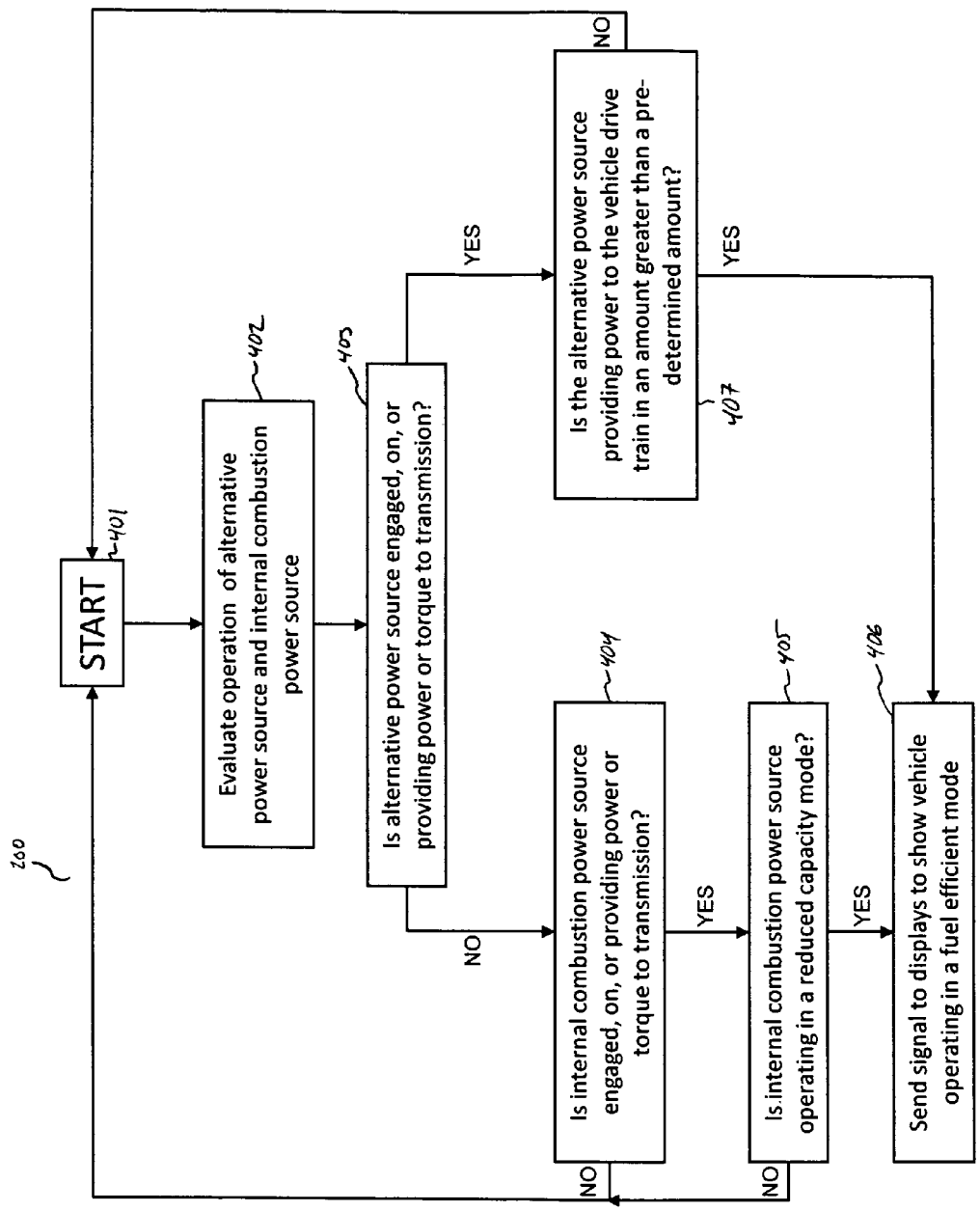
FIG. 3 is a flowchart of a preferred embodiment.

In use, referring to FIG. 3, electronic control unit 200 performs the following steps. At start position 401, electronic control unit 200 first evaluates the operation of alternative power source 104 and internal combustion power source 103 at step 402. At step 403, electronic control unit 200 then determines whether alternative power source 104 is engaged, on, or providing power or torque to transmission 105. If alternative power source 104 is engaged, on, or providing power or torque to transmission 105, electronic control unit 200 determines whether alternative power source 104 is providing power to transmission 105 in an amount greater than a pre-determined amount chosen or set by a user or vehicle manufacturer at step 407. If alternative power source 104 is providing power to transmission 105 in an amount greater than the pre-determined amount chosen or set by a user or manufacturer, then a signal is sent to displays 205 and billboard 300 through transmitter 206, antenna 207, receiver 302, and controller 304 to show that vehicle 100 is operating in a fuel-efficient mode at step 406. If alternative power source 104 is not providing power to transmission 105 in an amount greater than the pre-determined amount, then electronic control unit 200 restarts the evaluation at step 401.

If alternative power source 104 is not engaged, on, or providing power or torque to transmission 105, then electronic control unit 200 determines whether internal combustion power source 103 is engaged, on, or providing power or torque to transmission 105 at step 404. If not, then electronic control unit 200 restarts the evaluation at step 401. If internal combustion power source 103 is engaged, on, or providing power or torque to transmission 105, then electronic control unit 200 evaluates whether internal combustion power source 103 is operating in a reduced capacity mode at step 405. If not, then electronic control unit 200 restarts the evaluation at step 401. If internal combustion power source 103 is operating in the reduced capacity mode, then a signal is sent to displays 205 and billboard 300 through transmitter 206, antenna 207, receiver 302, and controller 304 to show vehicle 100 is operating in a fuel-efficient mode at step 406.

At step 407, a pre-determined amount may be any chosen power amount a user or manufacturer desires for alternative power source 104 to overcome. For example, if alternative power source 104 is providing 0.1%, 1%, 25%, 50%, 75%, or 100%, or any amount in between 0% and 100% of the propulsion power for vehicle 100.

At step 405, internal combustion power source 103 is operating in a reduced capacity if, for example, internal combustion power source 103 is operating on less than all available engine cylinders.

At step 406, the displays to which the signal is sent to illuminate are displays 205 located on the vehicle, inside the vehicle, or on an exterior display, such as billboard 300.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A system for displaying an engine power percentage of a vehicle having a first engine, a second engine and a transmission, the first engine and the second engine applying power to the transmission, the system comprising:
 a controller, connected to the first engine, the second engine and the transmission;
 an internal vehicle display, connected to the controller;
 an exterior vehicle display, connected to the controller;
 the controller programmed to carry out the steps of:
  monitoring the power applied to the transmission;
  determining a propulsion power percentage between the first engine and the second engine based on the power applied to the transmission; and
  transmitting the propulsion power percentage to the internal vehicle display and the exterior vehicle display.

2. The system of claim 1, further comprising:
 a wireless transmitter operatively connected to the controller;
 an advertising display, unattached to the vehicle, in wireless communication with the wireless transmitter; and
 the controller further programmed to carry out the step of transmitting the propulsion power percentage to the advertising display through the wireless transmitter.

3. The system of claim 1, further comprising:
 a first torque sensor attached to the first engine;
 a second torque sensor attached to the second engine; and,
 wherein the step of determining further comprises:
  monitoring the first torque sensor; and,
  monitoring the second torque sensor.

4. The system of claim 1, further comprising:

a receiver in communication with the wireless transmitter;

an advertising controller operatively connected to the receiver and the advertising display;

wherein the advertising controller is programmed to carry out the steps of:

determining a number of vehicles operating in a fuel-efficient mode; and, displaying a message, on the advertising display, showing the number of vehicles operating in the fuel-efficient mode.

5. The system of claim 4, wherein the advertising controller is further programmed to carry out the step of:

sending the message to the receiver, the receiver transmits the message to the vehicle, and the vehicle receives the message and displays the message on the internal vehicle display.

6. The system of claim 1, wherein at least one of the group of the first engine and the second engine is an internal combustion engine operating in a reduced capacity.

7. The system of claim 1, wherein at least one of the group of the first engine and the second engine is an alternative fuel-based engine providing more than a pre-determined level of power to the transmission.

8. A method for displaying a first fuel-efficiency status of a first alternative fuel-based vehicle, the alternate fuel-based vehicle having a first engine and a second engine operatively connected to a transmission, the first engine having a first torque, and the second engine having a second torque, the method comprising the steps of:

monitoring the first torque;

monitoring the second torque;

determining the first fuel-efficiency status based on the first torque and the second torque;

transmitting the first fuel-efficiency status to an external vehicle display, an internal vehicle display, and an advertising display unattached to the vehicle; and, displaying the first fuel-efficiency status on the external vehicle display, the internal vehicle display, and the advertising display.

9. The method of claim 8, wherein one of the group of the first engine and the second engine is an alternative fuel-based engine, and, wherein the step of determining the first fuel-efficiency status further comprises the step of:

determining if the alternative fuel-based engine is providing power to the transmission in an amount greater than a pre-determined amount.

10. The method of claim 8, wherein one of the group of the first engine and the second engine is an internal combustion engine and the step of determining the first fuel-efficiency status further comprises the step of:

determining if the internal combustion engine is operating in a reduced capacity mode.

11. The method of claim 8, wherein the step of displaying the first fuel-efficiency status further comprises the steps of:

receiving the first fuel-efficiency status;

deriving a second status based on the first fuel-efficiency status;

sending the second status to the advertising display; and, displaying the second status on the advertising display.

12. The method of claim 11, further comprising the steps of:

sending the second status from the advertising display to the first alternative fuel-based vehicle;

receiving the second status by the first alternative fuel-based vehicle from the advertising display; and, displaying the second status on the internal vehicle display.

13. The method of claim 11, further comprises the steps of:

receiving a second fuel-efficiency status from a second alternative fuel-based vehicle; and, including the second fuel-efficiency status in the second status.

* * * * *